US008958093B2

(12) United States Patent
Suzuki

(10) Patent No.: US 8,958,093 B2
(45) Date of Patent: Feb. 17, 2015

(54) PRINT CONTROL DEVICE, PRINT CONTROL METHOD AND PROGRAM

(71) Applicant: Canon Kabushiki Kaisha, Tokyo (JP)

(72) Inventor: Takeshi Suzuki, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 102 days.

(21) Appl. No.: 13/669,106

(22) Filed: Nov. 5, 2012

(65) Prior Publication Data

US 2013/0148153 A1 Jun. 13, 2013

(30) Foreign Application Priority Data

Dec. 8, 2011 (JP) ................................. 2011-268606

(51) Int. Cl.
*G06K 15/02* (2006.01)
(52) U.S. Cl.
USPC ......................................... 358/1.14; 358/437
(58) Field of Classification Search
CPC .............. G06K 15/02; G06K 15/1801; G06K 15/1803; G06K 15/1806; G06K 15/1809; G06F 3/1204; G06F 3/1274; G06F 3/1284; G06F 3/1258
USPC ......... 358/1.1, 1.14, 400, 401, 434, 437, 442, 358/444
See application file for complete search history.

(56) References Cited

U.S. PATENT DOCUMENTS

| 7,310,156 | B2 | 12/2007 | Watanabe et al. | |
|---|---|---|---|---|
| 7,428,072 | B2 | 9/2008 | Suzuki | |
| 7,907,300 | B2 | 3/2011 | Suzuki | |
| 8,125,686 | B2 | 2/2012 | Akado et al. | |
| 8,248,626 | B2 | 8/2012 | Suzuki | |
| 2007/0076242 | A1* | 4/2007 | Kanai ........................ | 358/1.14 |
| 2008/0080008 | A1* | 4/2008 | Yamamoto et al. .......... | 358/1.18 |
| 2008/0094650 | A1 | 4/2008 | Suzuki | |
| 2011/0058216 | A1 | 3/2011 | Kishida et al. | |

FOREIGN PATENT DOCUMENTS

JP 2007-102496 4/2007

OTHER PUBLICATIONS

U.S. Appl. No. 13/633,719, filed Oct. 2, 2012. Inventor: Suzuki.

* cited by examiner

*Primary Examiner* — Thomas D Lee
(74) *Attorney, Agent, or Firm* — Fitzpatrick, Cella, Harper & Scinto

(57) ABSTRACT

When a print stop instruction is input in accordance with a user's operation, a stage to stop print is decided among a plurality of stages in accordance with the print condition for print and the print by the print apparatus is stopped at the decided stage. Thereby, print by the print apparatus can be canceled appropriately.

20 Claims, 5 Drawing Sheets

PRINT CANCEL ACTIVITIES

| | | | CAUSES FOR PRINT CANCEL ||||||
|---|---|---|---|---|---|---|---|---|
| | | | DEPRESS CANCEL KEY || DISMOUNT CARD || DEPRESS PS KEY ||
| PRINT CONDITION | PHOTO PRINT | PLAIN PAPER | CANCEL PRINT IMMEDIATELY | 401 | CANCEL PRINT IMMEDIATELY | 407 | CANCEL PRINT BETWEEN VOLUME | 413 |
| | | PHOTO PAPER | CANCEL PRINT BETWEEN PAGES | 402 | CANCEL PRINT BETWEEN PAGES | 408 | CANCEL PRINT BETWEEN JOBS | 414 |
| | DOCUMENT PRINT | PLAIN PAPER | CANCEL PRINT IMMEDIATELY | 403 | CANCEL PRINT IMMEDIATELY | 409 | CANCEL PRINT BETWEEN VOLUME | 415 |
| | COPY | PLAIN PAPER | CANCEL PRINT AT DISCONTINUITY OF IMAGES | 404 | | 410 | CANCEL PRINT BETWEEN VOLUME | 416 |
| | | PHOTO PAPER | CANCEL PRINT BETWEEN PAGES | 405 | | 411 | CANCEL PRINT BETWEEN VOLUME | 417 |
| | FAX RECEIVE PRINT | PLAIN PAPER | INQUIRE TO USER | 406 | | 412 | CANCEL PRINT BETWEEN VOLUME | 418 |

PRINT CANCEL ACTIVITIES

| | | CAUSES FOR PRINT CANCEL | | | | | |
|---|---|---|---|---|---|---|---|
| | | DEPRESS CANCEL KEY | | DISMOUNT CARD | | DEPRESS PS KEY | |
| PRINT CONDITION | PHOTO PRINT / PLAIN PAPER | CANCEL PRINT IMMEDIATELY | 401 | CANCEL PRINT IMMEDIATELY | 407 | CANCEL PRINT BETWEEN VOLUME | 413 |
| | PHOTO PRINT / PHOTO PAPER | CANCEL PRINT BETWEEN PAGES | 402 | CANCEL PRINT BETWEEN PAGES | 408 | CANCEL PRINT BETWEEN JOBS | 414 |
| | DOCUMENT PRINT / PLAIN PAPER | CANCEL PRINT IMMEDIATELY | 403 | CANCEL PRINT IMMEDIATELY | 409 | CANCEL PRINT BETWEEN VOLUME | 415 |
| | COPY / PLAIN PAPER | CANCEL PRINT AT DISCONTINUITY OF IMAGES | 404 | | 410 | CANCEL PRINT BETWEEN VOLUME | 416 |
| | COPY / PHOTO PAPER | CANCEL PRINT BETWEEN PAGES | 405 | | 411 | CANCEL PRINT BETWEEN VOLUME | 417 |
| | FAX RECEIVE PRINT / PLAIN PAPER | INQUIRE TO USER | 406 | | 412 | CANCEL PRINT BETWEEN VOLUME | 418 |

PRINT CONTROL DEVICE, PRINT CONTROL METHOD AND PROGRAM

BACKGROUND OF THE INVENTION

1. Field of the Invention

The present invention relates to a print control device that causes a print apparatus to print an image, a print control method and a program.

2. Description of the Related Art

As a user depresses a cancel key of a print apparatus such as a printer, a copier or a facsimile during print process, the print process may be canceled immediately or as quickly as possible. Alternatively, print process may be canceled immediately when a power supply key is depressed during the print process or when a memory card is dismounted from a memory card slot during printing through the memory card.

In order to interrupt printing, various types of print cancel control are available, including "continue print being in process to the right place for interruption before cancel", "cancel print immediately" and the like. Japanese Patent Application Laid-Open No. 2007-102496 describes the technique of, when a user depresses a cancel button during copying of multiple volumes of multiple documents, displaying options such as "cancel print between pages" and "cancel print between volumes" on an operating section and executing a print cancel activity selected by the user. This technique can realize a print cancel activity as a user wants.

However, the print cancel activities that a user is allowed to select on the operation section are fixed irrespective of print conditions such as types of applications (photo print or document print) and types of printed sheets (plain paper or photo paper). Accordingly it may be difficult for a user to select an appropriate activity even when options for the print cancel activity are displayed.

SUMMARY OF THE INVENTION

A print control device of the present invention includes: a print control unit that acquires a print condition for print of an image and causes a print apparatus to print the image in accordance with the print condition acquired; an input unit that, when the print apparatus prints the image under control of the print control unit, inputs a print stop instruction to stop print of the image in accordance with a user's operation; and a control unit that, when the print stop instruction is input by the input unit, decides a stage to stop print among a plurality of stages in accordance with the print condition for print and stops the print by the print apparatus at the decided stage.

With this configuration, print by the print apparatus can be canceled appropriately.

Further features of the present invention will become apparent from the following description of exemplary embodiments with reference to the attached drawings.

BRIEF DESCRIPTION OF THE DRAWINGS

FIG. 4 shows an exemplary relation between print cancel activities and the combination of print conditions and causes for print cancel.

DESCRIPTION OF THE EMBODIMENTS

Preferred embodiments of the present invention will now be described in detail in accordance with the accompanying drawings.

Figure 1:
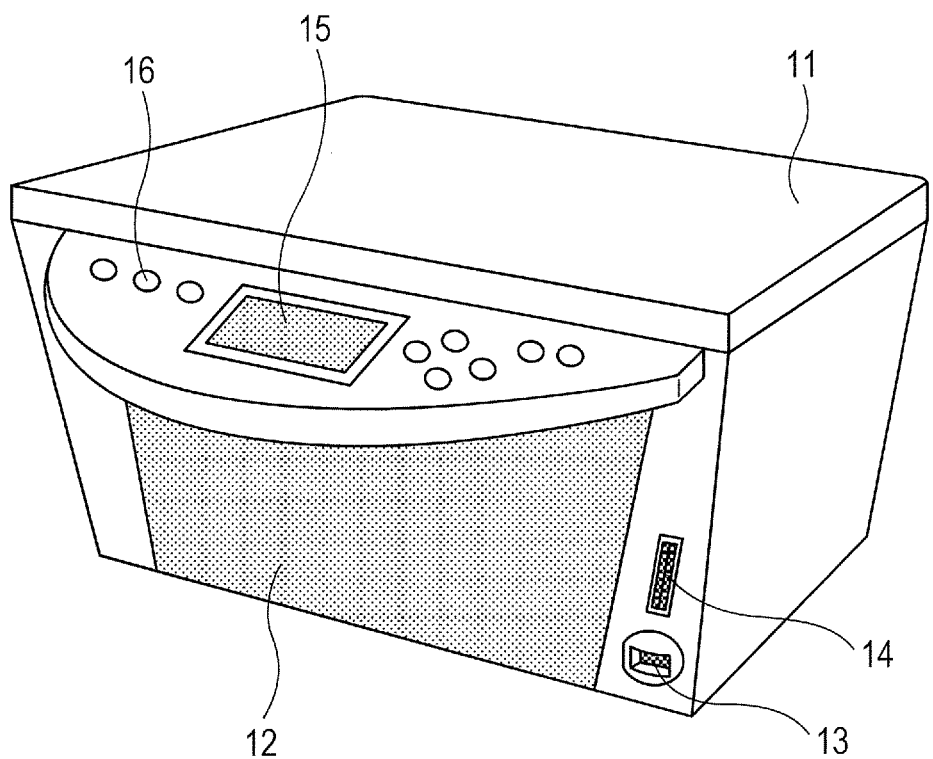
FIG. 1 is a schematic perspective view of a MFP apparatus 100 of the present embodiment.

FIG. 1 is a schematic perspective view of a MFP apparatus 100 of one embodiment.

The MFP apparatus 100 is a multifunction print apparatus, which is one of data processing apparatuses. The MFP apparatus 100 includes a top cover 11, a discharge tray 12, a connector 13, a card slot 14, a liquid crystal display 15 and an operating section 16. The MFP apparatus 100 further includes a printer engine inside to print an image on a recording sheet stored in a sheet cassette. This print engine includes a sheet feeding section to feed a sheet from the sheet cassette, a conveyance section to convey the fed sheet, a printing section to print an image on the conveyed sheet and a discharge section to discharge the sheet with an image printed thereon to the discharge tray 12. Recording agents used by the printing section and printing methods are not limited especially. There may be used an ink jet method that discharges ink on a sheet or a printing method that fixes toner on a sheet, for example. FIG. 1 shows the state of closing the top cover 11, and when the top cover 11 is opened, a document can be placed on an original platen.

FIG. 1 shows the state where the discharge tray 12 is closed, and when the discharge tray 12 is opened before printing, then the discharge tray 12 functions as a discharge tray for sheets subjected to printing. To the connector 13 is connected a digital camera, through which image files stored in a memory inside the digital camera connected are read out. Into the card slot 14 is inserted a memory card, from which image files and document files stored are read out.

The liquid crystal display 15 displays a screen to perform various settings such as a magnification factor or copy density for copying by the MFP apparatus 100 and various settings such as a sheet size, a sheet type or a quality for printing of an image file or a document file from a memory card, manipulate maintenance functions of the apparatus, and the like. The liquid crystal display 15 further displays a screen to show a state of the MFP apparatus 100 when any malfunction occurs in the MFP apparatus 100, a screen showing a guidance on operation when a user performs a forbidden operation, and the like.

The operating section 16 is for giving an instruction to the MFP apparatus 100 in response to an operation by a user, including keys for operations such as arrow keys for up, down, left and right, a copy mode key and a print start key, and a wheel device, for example. When a user operates the operating section 16, an instruction from the user is input to the MFP apparatus 100, and a CPU controls the MFP apparatus 100 as a whole in accordance with this instruction. Note here that the MFP apparatus 100 can be connected to a host computer (PC) and can receive images to be printed and various instructions through communications with the PC.

With the above configuration, the MFP apparatus 100 has a function as a typical PC printer that receives data from the host computer (PC) connected for printing. The MFP apparatus 100 further has a scan function that reads out a document placed on the original platen in response to an activity instruction from the PC or the operating section 16, and executes a function of storing the read image data in a memory card mounted in the card slot 14 or a copy function of printing the read image data. The MFP apparatus 100 still further has a print function of reading out an image file or a document file stored in a memory card mounted to print the read-out file or a print function of receiving an image file from a digital camera connected to the connector 13 to print the received file.

Figure 2:
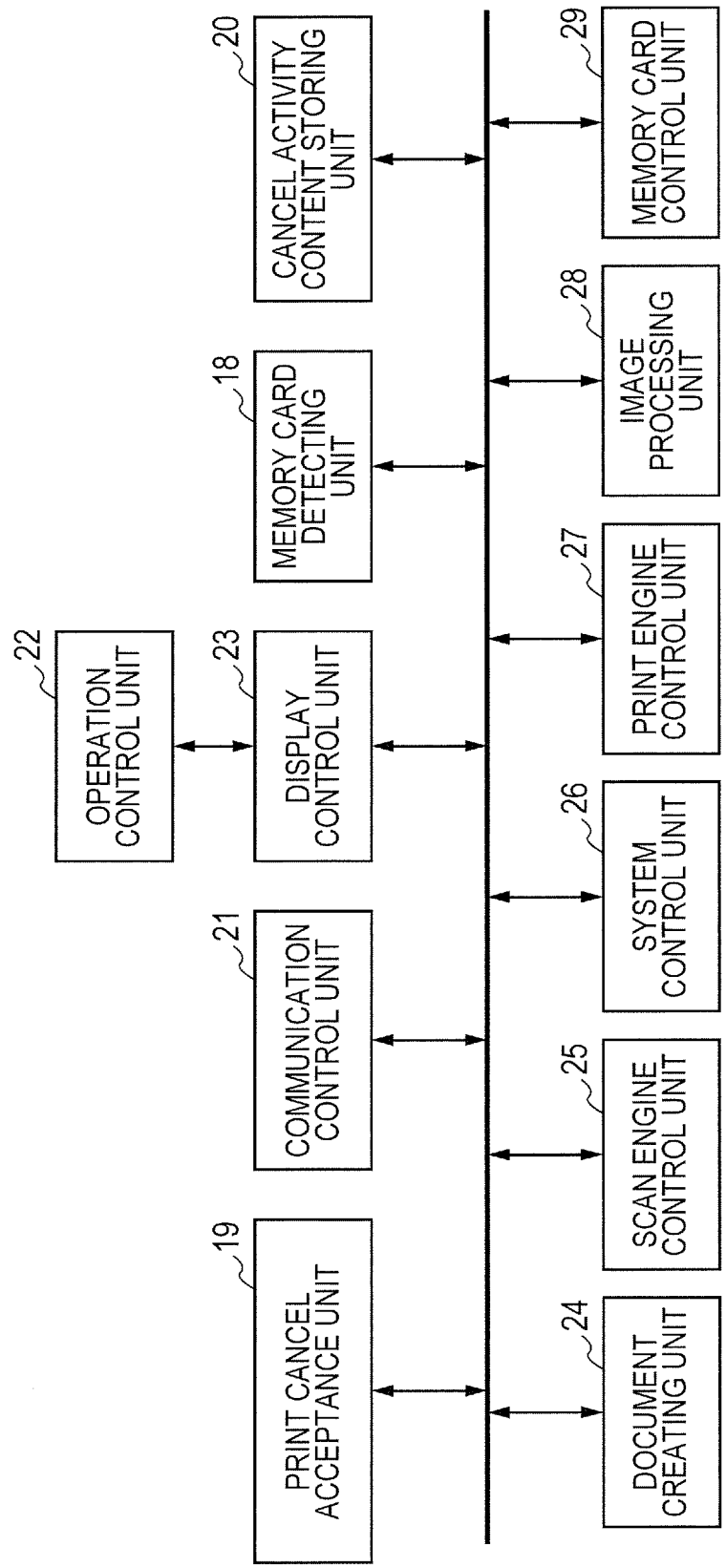
FIG. 2 is a functional block diagram of the MFP apparatus 100.

FIG. 2 is a functional block diagram showing the MFP apparatus 100.

Each function shown in FIG. 2 is implemented by the CPU of the MFP apparatus 100 executing various programs stored in a memory such as a ROM. The MFP apparatus 100 includes a communication control unit 21, an operation control unit 22, a display control unit 23, a document creating unit 24, a scan engine control unit 25, a system control unit 26, a print engine control unit 27, an image processing unit 28 and a memory card control unit 29. The MFP apparatus 100 further includes a memory card detecting unit 18, a print cancel acceptance unit 19 and a cancel activity content storing unit 20.

The communication control unit 21 controls data communications with a PC and various servers connected by communication methods using a USB, a wired LAN or the like. The communication method used may be a well-known one, whose description has been omitted. The operation control unit 22 detects depression of various keys of the operating section 16 of the MFP apparatus 100, converts it into a logical key operation message and transmits the same to various functional blocks. When a cancel key or a power supply key is depressed, the operation control unit 22 notifies the print cancel acceptance unit 19 as such.

In accordance with a key operation message transmitted from the operation control unit 22, for example, the display control unit 23 causes the liquid crystal display 15 to display an image to be printed or various settings such as a reading size setting required for storing in a scan to memory function. The display control unit 23 further causes the liquid crystal display 15 to display a print cancel activity corresponding to the combination of a print condition and a cause for print cancel set in the cancel activity content storing unit 20. Then, when a user checks the display by the display control unit 23 and operates the operating section 16, then a setting on the print cancel activity can be changed. The details thereon will be described later.

The document creating unit 24 converts image data of a document on a sheet, which is converted into data by the scan engine control unit 25 described later, into an appropriate format, which is then executed in the scan to memory function, for example. Herein, the scan to memory function is a function to store image data obtained by scanning in a memory such as a USB memory. The scan engine control unit 25 controls a scan engine to implement a copy function, the scan to memory function or PC scanning.

The system control unit 26 makes an adjustment of various control units for exclusion control of physical resources, sequence control and management of statuses of the MFP apparatus 100 such as various errors and a remaining ink level. The print engine control unit 27 controls the print engine of the MFP apparatus 100 to print an image on a sheet. More specifically, the print engine control unit 27 performs control relating to print process such as discharge control of ink drops, feeding or discharging of sheets, controlling of a print head, copy print, photo print or PC print. At this time, the print engine control unit 27 executes print in accordance with print conditions stored in a memory in the MFP apparatus 100. These print conditions include a type of sheets for image printing (plain paper or photo paper) a sheet size and applications used for creating of an image to be printed. The applications include photo print, document print, copy and fax receive print that the MFP apparatus 100 can execute.

These print conditions may be decided in accordance with a user's instruction that is input by the operation control unit 22 in response to the operation of the operating section 16 by the user, or may be decided in accordance with a user's instruction that is input to a PC connected to the MFP apparatus 100. The thus decided print conditions are stored in a memory such as a RAM in the MFP apparatus. When there is no instruction from a user, an image may be printed in accordance with print conditions stored beforehand in the MFP apparatus.

When the print cancel acceptance unit 19 described later accepts a print cancel request during printing, the print engine control unit 27 stops the print engine to cancel the print. At this time, the print engine control unit 27 refers to information stored in the cancel activity content storing unit 20 described later, and detects a print cancel activity corresponding to the combination of a print condition of the print process and a cause for print cancel. Then, the print engine control unit 27 controls print so as to cause the print engine to execute the detected print cancel activity.

The image processing unit 28 converts print data transmitted from the PC and transmits the same to the print engine control unit 27, or performs decoding, trimming or the like of an image for photo print. The image processing unit 28 further holds region information on print layout, and performs arrangement of image data or the like at the layout position, image processing such as scaling and processing about color, binarization, brightness, saturation, red-eye correction and the like. The image processing unit 28 further creates image data required by the document creating unit 24.

The memory card detecting unit 18 detects the insertion of a memory card into the card slot 14 and notifies the memory card control unit 29 as such. The memory card detecting unit 18 further detects the dismounting of a memory card and notifies the memory card control unit 29 and the print cancel acceptance unit 19 of the dismounting.

The memory card control unit 29 performs reading/writing processing of an image file or a document file stored in a memory card mounted in the card slot 14 for preview display and printing through the memory card, for example.

The print cancel acceptance unit 19 receives a notification from the operation control unit 22 on depression of the cancel key or the power supply key or a notification from the memory card detecting unit 18 on the dismounting of a memory card. In this embodiment, when the cancel key or the power supply key is depressed or a memory card is dismounted during printing, the print is canceled. Then, receiving a notification as stated above, the print cancel acceptance unit 19 sends a command for an instruction on print cancel to the print engine control unit 27. This command includes information indicating the aforementioned notification content added thereto, whereby the print engine control unit 27 can specify the cause of cancel based on the information.

The cancel activity content storing unit 20 stores a table indicating print cancel activities corresponding to the combinations of print conditions and causes for print cancel, and the table is referred to by the display control unit 23, the print cancel acceptance unit 19 and the print engine control unit 27. The system control unit 26 can change the print cancel activities corresponding to the combinations of print conditions and causes for print cancel described in this table in accordance with a user's instruction input by the operation control unit 22. The details of the table stored in the cancel activity content storing unit 20 will be described later, referring to FIG. 4.

The following describes an operation by the MFP apparatus 100.

Firstly when the cancel key or the power supply key provided at the operating section 16 of the MFP apparatus 100 is depressed or when a memory card inserted into the card slot 14 is dismounted, the print cancel acceptance unit 19 is notified as such. When the communication control unit 21 receives a print cancel request from the PC as well, the print cancel acceptance unit 19 is notified as such.

Figure 3:
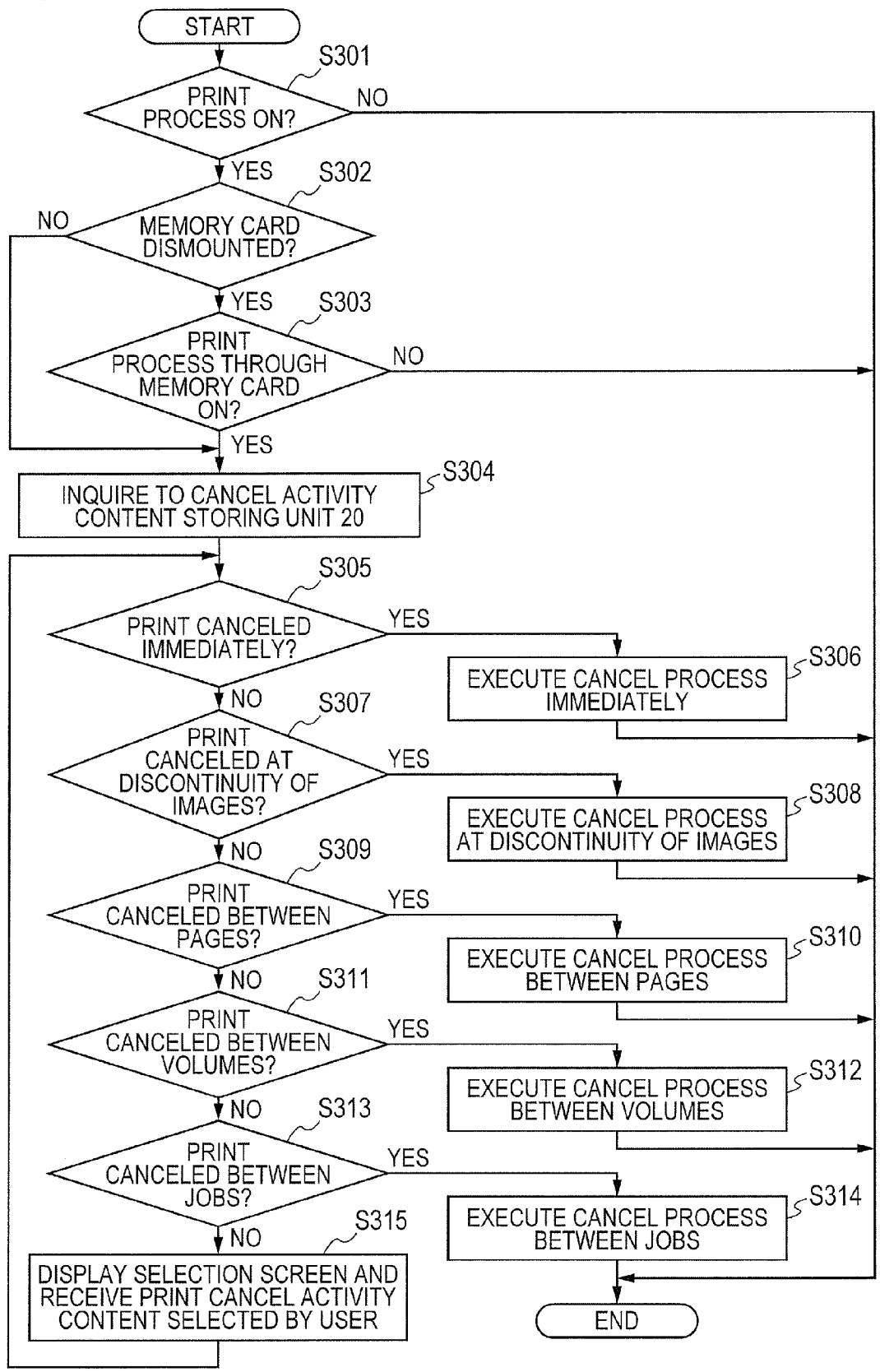
FIG. 3 is a flowchart showing the operation of the MFP apparatus 100.

FIG. 3 is a flowchart showing an operation by the MFP apparatus 100 after the print cancel acceptance unit 19 receives a notification on depression of the cancel key or the power supply key. The process shown in this flowchart can be implemented by the CPU of the MFP apparatus 100 executing a program stored in a memory such as a ROM to execute various functions shown in FIG. 2.

Firstly, at S301, determination is made as to whether print process by the MFP apparatus 100 is on or not. When print process is not on, the process by the print cancel acceptance unit 19 is finished. On the other hand, when print process is on, at S302, determination is made as to whether the notification is about "memory card inserted in the card slot 14 dismounted" or not. When the memory card is not dismounted, the process proceeds to S304. On the other hand, when the memory card is dismounted, at S303, determination is made as to whether print process through the memory card is on or not.

When the print process through the memory card is not on, since there is no need to cancel the print process even when the memory card is dismounted, the process by the print cancel acceptance unit 19 is finished. On the other hand, when the print process through the memory card is on, since the print process has to be canceled, the process proceeds to S304.

At S304, inquiry is made to the cancel activity content storing unit 20 to refer to the aforementioned table, whereby a print cancel activity corresponding to the combination of a print condition and a cause for print cancel is acquired. Herein, the "print condition" refers to the types of sheets (plain paper or photo paper), the types of applications (photo print or document print) and the like. The "cause for print cancel" refers to a cause to cancel the print, which is at least one of depression of the cancel key, depression of the power supply key, dismounting of a memory card during memory card-based print and a print cancel instruction from an external apparatus. Herein, the print condition may be specified by acquiring information stored in a memory such as a RAM of the MFP apparatus 100 when the print process is to be executed.

FIG. 4 shows exemplary print cancel activities corresponding to the combinations of print conditions and causes for print cancel. As shown in FIG. 4, in the present embodiment, each of a plurality of stages to stop print is associated with the combination of a print condition and a cause for print cancel. In the present embodiment, print is canceled at timing corresponding to the print cancel activities defined in FIG. 4.

For instance, when the type of applications as the print condition is photo print and the type of sheets is photo paper and the cause for print cancel is depression of the cancel key, then activity (402) to "cancel print between pages" can be acquired based on the examples shown in FIG. 4. Similarly to this, when the type of applications as the print condition is document print and the type of sheets is plain paper and the cause for print cancel is dismount card, then activity (409) to "cancel print immediately" can be acquired from FIG. 4.

In the examples shown in FIG. 4, setting is made so that print is immediately canceled, when the cancel key is depressed or the card is dismounted and the sheet used for print is plain paper. Such setting is made because plain paper is used often for document print and a user tends to interrupt the print when a part in a document that the user wants to print has been printed.

On the other hand, when the sheet is photo paper, setting is made so that print is not canceled at least before completion of print on one page. Such setting is made because to allow one photo as a whole may be printed even when print cancel is instructed. Photo paper is often used for print of photos shot by a digital camera or the like, and the entire printed one may be used as a printed matter. Further since photo paper is normally expensive more than plain paper, print is canceled between pages so as to allow the print paper being printed to be used as a printed matter.

In a case where a print cancel activity is performed for photo paper on which an image is to be printed, if the user further instructs to cancel the print while print is continuously performed toward a rear end of a page after input of the cancel instruction, then the print may be canceled even before completion of print on one page.

In the examples shown in FIG. 4, when print cancel of an image received by fax is instructed, the liquid crystal display 15 displays options of print cancel activities so as to inquire a user of a print cancel activity. At S315 described later, in response to this inquiry, information indicating the content of a print cancel activity selected by the user is received.

At S305 of FIG. 3, determination is made as to whether the print cancel activity acquired at S304 or the print cancel activity selected by the user at S315 is an activity to "cancel print immediately" or not.

When it is determined at S305 that the activity is to "cancel print immediately", at S306 print is canceled immediately. For instance, discharge of ink by the printing section of the print engine is canceled and a sheet being printed is discharged to the discharge tray by the discharge section. Such immediate cancel of print can cut wasted ink or toner. In this case, although print has been performed before completion of print on one page, the sheet is more likely to be reused compared with the case of print cancel after completion of the print. For instance, when print is performed halfway through a surface of both-side printable plain paper, a rear face thereof can be reused. Further, looking at a sheet being discharged to the discharge tray, when the user finds the printing of a part that the user wants has been finished, the user may depress the cancel key, whereby necessary information can be printed while suppressing the usage amount of a recording agent.

On the other hand, when the activity is not to "cancel print immediately" at S305, at S307, determination is made as to whether the print cancel activity acquired at S304 or the print cancel activity selected by the user at S315 is an activity to "cancel print at discontinuity of images" or not. When the activity is to "cancel print at discontinuity of images", at Step 308, print cancel process is executed when the print process is about to reach discontinuity of images.

Although not described as the print conditions of FIG. 4, the print conditions may include Nin1 such as 2in1, 3in1 and 4in1 (N is an integer of 2 or more, such as 2, 3, 4 . . . ). For instance, print is executed while setting 2in1 for setting of copy, and when the cancel key is depressed during printing of a first image of 2in1, then print cancel process is executed at the timing after the printing of the first image being printed is finished. Thereby, the first image of 2in1 can be correctly printed, and the print cancel process can be executed without printing a second image.

On the other hand, when it is determined at S307 that the activity is not to "cancel print at discontinuity of images", at S309, determination is made as to whether the print cancel activity acquired at S304 or the print cancel activity selected by the user at S315 is an activity to "cancel print between pages" or not. When it is determined that the activity is to "cancel print between pages", at S310, print cancel process is executed when printing in one page is finished. For instance, when the cancel key is depressed during photo print on photo paper, print is not canceled until between pages, whereby expensive photo paper is not wasted for use. This is because photo paper printed halfway has difficulty in reuse unlike plain paper.

On the other hand, it is determined at S309 that the activity is not to "cancel print between pages", at S311, determination is made as to whether the print cancel activity acquired at S304 or the print cancel activity selected by the user at S315 is an activity to "cancel print between volumes" or not. When it is determined that the activity is to "cancel print between volumes", at S312, print cancel process is executed after print of a volume being executed currently is finished.

Note here although not described as the print conditions of FIG. 4, "stapled" may be set for copy as the print conditions. For instance, when "stapled" is set for copy and print is executed to copy a plurality of volumes of a plurality of documents, staple process and print are executed for each volume, before canceling the print. In this case, when the cancel key is depressed during printing of one of a plurality of volumes, print is completed for all documents of the volume being processed and stapling is performed thereto, and thereafter print cancel process is executed for the next volume or later. Thereby the volume being currently processed can be correctly printed, and then print cancel process can be executed without printing the next volume or later.

On the other hand, when it is determined at S311 that the activity is not to "cancel print between jobs", at S313, determination is made as to whether the print cancel activity acquired at S304 or the print cancel activity selected by the user at S315 is an activity to "cancel print between jobs" or not. When it is determined that the activity is to "cancel print between jobs", at Step S314, print cancel process is executed at the timing when print of the job currently being processed is finished, and when a plurality of jobs are reserved, print of the jobs reserved is canceled.

When it is determined at S311 that the activity is not to "cancel print between jobs", since the print cancel activity acquired at S304 is "inquiry to use", at S315 the list of print cancel activities is displayed on the liquid crystal display 15. Then, when the user selects a print cancel activity via the operating section 16, the process returns to S305. For instance, the list of the print cancel activities displayed includes "cancel print immediately", "cancel print at discontinuity of images", "cancel print between pages", "cancel print between volumes" and "cancel print between jobs". Alternatively, instead of displaying all of these print cancel activities, some of them only may be displayed so as to be associated with the combination of print conditions and causes for print cancel.

During the selection by the user from the list of print cancel activities, print may be temporarily canceled, or print may be continued without canceling until the user selects an activity.

As stated above, according to the flowchart of FIG. 3, a print cancel activity corresponding to the type of sheets or the type of applications can be executed, and even an inexperienced user can interrupt print correctly. In the process from S305 to S314, when a print cancel activity is decided, such a print cancel activity is automatically executed. Instead, the liquid crystal display 15 may display a check screen before performance of the actual cancel activity, and after reception of an instruction from the user after checking, the print cancel activity may be executed.

Besides the case of executing a print cancel activity automatically, the process may be configured so as to let a user select a print cancel activity. In this case, on a display screen proposing a plurality of options of the print cancel activities to a user may be shown an activity corresponding to the type of sheets or the type of applications as a recommended print cancel activity. Thereby even an inexperienced user can select an appropriate print cancel activity, and a user can interrupt the print with an activity that the user wants that is other than the recommended activity.

Herein the print conditions are not limited to the types of sheets (plain paper or photo paper), the types of applications (photo print or document print), layout (1in1, 2in1, 4in1) and stapled (No or Yes). For instance, various settings relating to print such as the types of documents (photos or documents), the print range (single side or double side), sort (No or Yes) and the like may be dealt with as the print conditions shown in FIG. 4.

Further similarly to the above, the causes for print cancel include, but not limited to, depression of the cancel key, depression of the power supply key and dismounting of a memory card during memory card-based printing. For instance, the MFP apparatus 100 may be connected to a not-illustrated PC via a wired LAN cable, and removal of the wired LAN cable during PC printing also may be one of the causes for print cancel.

Further in the configuration where the connector 13 and a not-illustrated digital camera are connected via a USB cable, when the USB cable is removed during data transferring from the digital camera based on PictBridge specifications or during printing, removal of the USB cable also may be one of the causes for print cancel. Moreover reception of a print cancel request from the PC to which the communication control unit 21 is connected also may be one of the causes for print cancel. Further similarly to the above, the print cancel activities that can be acquired from the cancel activity content storing unit 20 include "cancel print immediately", "cancel print at discontinuity of images", "cancel print between pages", "cancel print between volumes", "cancel print between jobs" and "inquiry to user" as shown in FIG. 3 and FIG. 4. The stages to stop print, however, are not limited to them. For instance, when a cause for print cancel occurs during double-side printing, the activity to "cancel print after single-side print" may be a print cancel activity. Alternatively, the activity to "cancel print between images" may be a print cancel activity. Moreover when a cause for print cancel occurs during printing of a document having a plurality of chapters and sections, the print cancel activities may be to "cancel print at a separation between chapters" or to "cancel print at a separation between sections". In this way, in the present embodiment, print can be stopped at various stages corresponding to the print conditions.

The following describes process of newly setting a print cancel activity corresponding to print conditions in accordance with a user's instruction input via the operating section 16 of the MFP apparatus 100.

Figure 5:
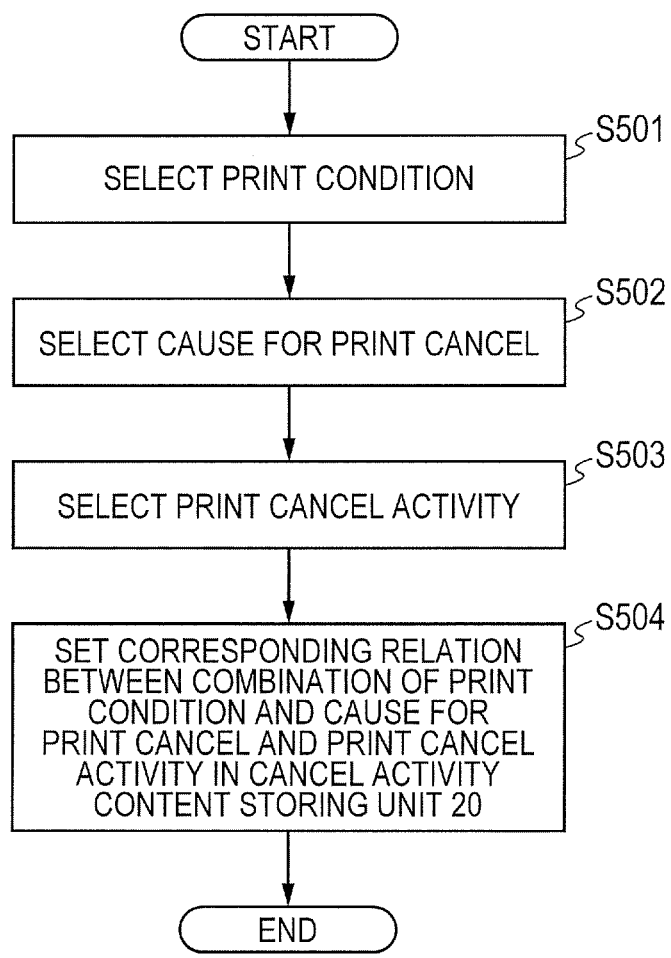
FIG. 5 is a flowchart showing an operation to set a print cancel activity.

FIG. 5 is a flowchart of an operation to set a print cancel activity. This flowchart can be implemented by the CPU of the MFP apparatus 100 executing a program stored in a ROM. In the functional block diagram of FIG. 2, this flowchart can be implemented by an operation of the system control unit 26.

At S501, print conditions such as the types of sheets (plain paper or photo paper) and applications (photo print or document print) displayed on the liquid crystal display 15 are selected using the operating section 16 in accordance with a user's instruction input by the operation control unit 22. Subsequently at S502, in accordance with the user's instruction input by the operation control unit 22, a cause for print cancel is selected, including depression of the cancel key, depression of the power supply key, dismounting of a memory card during memory card-based printing and the like displayed on the liquid crystal display 15.

Then at S503, in accordance with the user's instruction input by the operation control unit 22, a print cancel activity is selected from those displayed on the liquid crystal display 15. That is, any one of the plurality of stages to stop print displayed on the liquid crystal display 15 such as "cancel print immediately", "cancel print at discontinuity of images", "cancel print between pages", "cancel print between volumes", "cancel print between jobs" and "inquiry to user" is selected.

Finally at S504, the system control unit 26 sets, at the cancel activity content storing unit 20, the print cancel activity selected at S503 as an activity corresponding to the combination of the print condition and the cause for print cancel selected at S501 and S502. Thereby, the print cancel activity that the user wants can be executed in accordance with the combination of the print condition and the cause for print cancel.

In this embodiment, a user uses the operating section 16 of the MFP apparatus 100 to set a print cancel activity at the cancel activity content storing unit 20, but not limited thereto. For instance, a user may select with the PC "a print condition, a cause for print cancel and a print cancel activity" and sends the selected information to the MFP apparatus 100. Then, the "corresponding relation between combination of print conditions and causes for print cancel" received by the communication control unit 21 of the MFP apparatus 100 may be set at the cancel activity content storing unit 20.

According to this embodiment, when a user performs an activity for print cancel, print cancel process corresponding to the combination of the activity and the print condition is decided. Therefore, appropriate print cancel process can be executed.

According to this embodiment, print cancel process is performed in accordance with the content of the user's operation to the MFP apparatus 100 (depression of the cancel key, dismounting of a memory card and depression of the power supply key). But not limited to this, the MFP apparatus 100 may receive an input of an instruction to the PC connected to the MFP apparatus 100 from a user about print cancel, and may perform print cancel process in accordance with the instruction, for example.

This embodiment describes the example of printing an image as an output target on which objects are arranged, by a print apparatus, but not limited thereto, the embodiment is applicable to various types of output process such as display or transfer.

The above embodiments may be applied to a print system including a print apparatus and an external apparatus.

In the above description, each of the plurality of stages to stop print is associated with the combination of a print condition and a cause of print cancel. But not limited thereto, each stage of print cancel may be associated with a print condition only or with a cause for print cancel only, which may be stored in the cancel activity content storing unit 20 so that print is stopped at a stage corresponding to the print condition or the cause for print cancel.

The above embodiments may be implemented by executing the following process as well. That is, in the process, software (program) to implement the functions of the above embodiments is supplied to a system or an apparatus via a network or various storing media, and such a system or a computer (or CPU or MPU, for example) of the apparatus reads out the program for execution. For instance, programmed codes of a part or all of the process content are stored in a ROM, and the CPU may execute it. The program may be executed by one computer (CPU or MPU) or a plurality of computers may cooperate for execution. Not limited to the case of execution by a computer (or a CPU, a MPU or the like) of a program stored in a memory such as a ROM, hardware (circuit or the like) to perform the process described in the above embodiments may perform the process. A part of the process described in the above embodiments may be executed by a computer (or a CPU, a MPU or the like), and the remaining part may be executed by hardware.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-268606, filed Dec. 8, 2011, which is hereby incorporated by reference herein in its entirety.

What is claimed is:

1. A print control device, comprising:
a print control unit that acquires a sheet type, among a plurality of sheet types, of a sheet to be used for print of an image, and causes a print apparatus to print the image in accordance with the acquired sheet type;
an input unit that, while the print apparatus prints the image under control of the print control unit, inputs a print stop instruction to stop print of the image in accordance with a user's operation;
a determination unit that, in a case where the print stop instruction is input by the input unit, determines whether to stop print on one page even before completion of the print, in accordance with the acquired sheet type; and
a control unit that, in a case where the determination unit determines to stop the print on the one page, stops the print on the one page even before completion of the print.

2. The print control device according to claim 1, wherein the determination unit executes the determination in accordance with the sheet type and a cause of print stop corresponding to the print stop instruction input by the input unit among a plurality of causes.

3. The print control device according to claim 2, wherein the print control unit causes the print apparatus to print an image stored in an external memory connected to the print control device, and the plurality of causes includes a disconnection between the print control device and the external memory.

4. The print control device according to claim 2, wherein the input unit inputs the print stop instruction in accordance with a predetermined operation by a user to instruct print stop, and the plurality of causes includes the predetermined operation.

5. The print control device according to claim 1, wherein the determination unit determines whether to stop the print at a first stage in which the print is to be stopped even before completion of print on the one page or at a second stage in which the print is to be stopped after the completion of print on the one page, and
the control unit stops print at the first stage or the second stage in accordance with the determination.

6. The print control device according to claim 5, wherein the determination unit executes the determination so that the print is stopped at the first stage in a case where a sheet type corresponding to the print is a plain paper and the print is stopped at the second stage in a case where a sheet type corresponding to the print is a photo paper.

7. The print control device according to claim 5, wherein the second stage is a stage in which the print is stopped between pages.

8. The print control device according to claim 1, wherein the print control unit causes the print apparatus to print an image in accordance with a function among a plurality of functions, and the determination unit executes the determination in accordance with the sheet type and the function.

9. The print control device according to claim 1, further comprising a setting unit configured to set, regarding the sheet type, whether to stop print on the one page before completion of the print, in accordance with a user's operation,
wherein the determination unit executes the determination in accordance with the sheet type and the setting by the setting unit.

10. The print control device according to claim 1, further comprising a print unit as the print apparatus, and the print control unit causes the print unit to print an image.

11. A print control method executed by a processor of print control device, comprising:
a print control step of acquiring a sheet type, among a plurality of sheet types, of a sheet to be used for print of an image, and causing a print apparatus to print the image in accordance with the acquired sheet type;
inputting, while the print apparatus prints the image, a print stop instruction to stop print of the image in accordance with a user's operation;
determining, in a case where the print stop instruction is input by the input step, whether to stop print on one page even before completion of the print, in accordance with the acquired sheet type; and
controlling, in a case where the determining determines to stop the print on the one page, to stop the print on the one page even before completion of the print.

12. A non-transitory computer-readable storage medium that stores computer-executable code of a program that, when executed by a processor, makes a computer execute the print control method according to claim 11.

13. The print control method according to claim 11, wherein the determining step executes the determination in accordance with the sheet type and a cause of print stop corresponding to the print stop instruction input by the input step among a plurality of causes.

14. The print control method according to claim 13, wherein the print control step causes the print apparatus to print an image stored in an external memory connected to the print control device, and the plurality of causes includes a disconnection between the print control device and the external memory.

15. The print control method according to claim 13, wherein the input step inputs the print stop instruction in accordance with a predetermined operation by a user to instruct print stop, and the plurality of causes includes the predetermined operation.

16. The print control method according to claim 11, wherein the determining step determines whether to stop the print at a first stage in which the print is to be stopped even before completion of print on one page or at a second stage in which the print is to be stopped after the completion of print on the page, and
the controlling step stops print at the first stage or the second stage in accordance with the determination.

17. The print control method according to claim 11, wherein the print control step causes the print apparatus to print an image in accordance with a function among a plurality of functions, and the determining step executes the determination in accordance with the sheet type and the function.

18. The print control method according to claim 11, further comprising a setting step of setting, regarding the sheet type, whether to stop print on the one page before completion of the print, in accordance with a user's operation,
wherein the determining step executes the determination in accordance with the sheet type and the setting by the setting step.

19. The print control method according to claim 16, wherein the determining step executes the determination, so that the print is stopped at the first stage in a case where a sheet type corresponding to the print is a plain paper and the print is stopped at the second stage in a case where a sheet type corresponding to the print is a photo paper.

20. The print control method according to claim 16, wherein the second stage is a stage in which the print is stopped between pages.

* * * * *